US012563126B2

(12) United States Patent
Pal et al.

(10) Patent No.: US 12,563,126 B2
(45) Date of Patent: Feb. 24, 2026

(54) INTERNET OF THINGS BASED MODULAR HARDWARE PLATFORM

(71) Applicant: TATA COMMUNICATIONS COLLABORATION SERVICES PRIVATE LIMITED, Mumbai (IN)

(72) Inventors: Dwaipayan Pal, Haryana (IN); Praveen Arora, Haryana (IN)

(73) Assignee: TATA COMMUNICATIONS COLLABORATION SERVICES PRIVATE LIMITED, Maharashtra (IN)

( * ) Notice: Subject to any disclaimer, the term of this patent is extended or adjusted under 35 U.S.C. 154(b) by 1013 days.

(21) Appl. No.: 17/557,503

(22) Filed: Dec. 21, 2021

(65) Prior Publication Data

US 2022/0210236 A1 Jun. 30, 2022

(30) Foreign Application Priority Data

Dec. 29, 2020 (IN) .............................. 202021056990

(51) Int. Cl.
*H04L 67/52* (2022.01)
*G06F 21/85* (2013.01)
*H04L 67/147* (2022.01)

(52) U.S. Cl.
CPC .............. *H04L 67/52* (2022.05); *G06F 21/85* (2013.01); *H04L 67/147* (2013.01)

(58) Field of Classification Search
CPC ... H04L 67/52; H04L 67/147; H04L 63/0464; H04L 67/12; G06F 21/85; H04W 12/033; H04W 4/38; H04W 4/80; H04W 4/70
See application file for complete search history.

(56) References Cited

U.S. PATENT DOCUMENTS 7,334,072 B1 * 2/2008 Wright ................ G06F 13/4045
710/16
9,929,771 B2 3/2018 Rose et al.
(Continued)

FOREIGN PATENT DOCUMENTS

BR 102016020965 A2 4/2018
CN 110601968 12/2019
(Continued)

OTHER PUBLICATIONS

Search Report and Written Opinion issued on Feb. 7, 2023 in French Patent Application No. FR2114303.
(Continued)

*Primary Examiner* — Ayaz R Sheikh
*Assistant Examiner* — Tarell A Hampton
(74) *Attorney, Agent, or Firm* — Kaplan Breyer Schwarz, LLP

(57) ABSTRACT

A modular hardware platform for detecting and monitoring a plurality of non-internet enabled peripheral devices, where each peripheral device communicates using one of a plurality of communications protocols. The modular platform includes a processor for acting as a bridge between one or more communication modules and each of the peripheral devices. The processor is configured translate the wired communication protocols of the peripheral devices to the wireless communication protocols of the communication modules to enable communication with a network server or a mobile device. The communications modules can include a LoRaWAN communication module for enabling communication between the modular platform and the network server; and a BLE module for enabling communication between the modular platform and the mobile device.

26 Claims, 8 Drawing Sheets

(56) References Cited

U.S. PATENT DOCUMENTS

| | | | |
|---|---|---|---|
| 9,948,349 B2 | 4/2018 | Malach | |
| 10,306,442 B1 | 5/2019 | Nuttall et al. | |
| 10,313,446 B2 | 6/2019 | Liu et al. | |
| 10,445,087 B2 | 10/2019 | Sato | |
| 10,531,382 B2 | 1/2020 | Arditti Ilitzky et al. | |
| 10,687,377 B2 | 6/2020 | Schwengler et al. | |
| 2001/0031997 A1* | 10/2001 | Lee | A61B 5/0002 |
| | | | 607/59 |
| 2006/0072151 A1* | 4/2006 | Amani | G06F 3/1285 |
| | | | 358/1.6 |
| 2014/0007209 A1* | 1/2014 | Zucker | H04W 12/50 |
| | | | 726/7 |
| 2015/0257091 A1* | 9/2015 | Zur | H04L 69/18 |
| | | | 455/41.2 |
| 2015/0341179 A1* | 11/2015 | Butler | H04L 12/10 |
| | | | 370/419 |
| 2017/0127497 A1* | 5/2017 | Baek | H05B 47/105 |
| 2018/0062873 A1 | 3/2018 | Chiang et al. | |
| 2018/0240329 A1* | 8/2018 | Steinmetz | H05K 5/0017 |
| 2018/0248568 A1* | 8/2018 | Chaplet | G06F 1/18 |
| 2019/0222336 A1 | 7/2019 | Nicolas et al. | |
| 2019/0312752 A1 | 10/2019 | Nogueira-Nine et al. | |
| 2019/0312959 A1 | 10/2019 | Hall et al. | |
| 2019/0345741 A1* | 11/2019 | Yates | E05B 67/003 |
| 2019/0362304 A1* | 11/2019 | Vivas Suarez | G06K 7/00 |
| 2019/0382238 A1* | 12/2019 | Witczak | B66B 5/0018 |
| 2020/0028540 A1 | 1/2020 | Teboulle et al. | |
| 2020/0107402 A1 | 4/2020 | Di Girolamo et al. | |
| 2020/0112880 A1 | 4/2020 | Teboulle et al. | |
| 2020/0118371 A1* | 4/2020 | Marcinkowski | G07C 9/00182 |
| 2020/0119969 A1 | 4/2020 | Niederfeld et al. | |
| 2020/0186383 A1 | 6/2020 | Sebastian et al. | |

FOREIGN PATENT DOCUMENTS

| | | | |
|---|---|---|---|
| CN | 211266892 | | 8/2020 |
| EP | 3554187 | | 10/2019 |
| GB | 2569355 | A | 6/2019 |
| KR | 10-2019-0134914 | A | 12/2019 |
| RU | 192192 | U1 | 9/2019 |
| RU | 194703 | U1 | 12/2019 |
| WO | 2018/002530 | A2 | 1/2018 |
| WO | 2018/083710 | A2 | 5/2018 |
| WO | 2019/103696 | A1 | 5/2019 |
| WO | 2019/159189 | | 8/2019 |
| WO | 2019/221419 | A1 | 11/2019 |
| WO | 2019/229512 | A1 | 12/2019 |
| WO | 2020/105765 | A1 | 5/2020 |

OTHER PUBLICATIONS

Dragino RS485 to LoRaWAN Converter (SX1276) RS485-LN-US915MHz, seeed, dated 2020, 2 pp., https://www.seeedstudio.com/RS485-to-LoRaWAN-Converter-SX1276-RS485-LN-US915MHz-p-4393.html.

LoRa Multi-sensor , RS485 RS232 to LoRa Converter by iFroglab, 6 pp., https://www.techdesign.com/hardware-solutions/LoRa-Multi-sensor-RS485-RS232-to-LoRa-Converter, Jun. 18, 2020.

LoRaWAN Tecnology STlife.augmented, dated 2020, 2 pp., https://www.st.com/en/wireless-transceivers-mcus-and-modules/lorawan-technology.html.

Marius Nicolae et al., "Adding LoRa RN2483 Click to AVR-IoT WG Board", Microchip Technology Inc., dated 2019, 38 pp., http://ww1.microchip.com/downloads/en/AppNotes/AN3076-Adding-LoRa-RN2483-Click-to-AVR-IoT-WG-Board-00003076A.pdf.

William G. Wong, "LoRaWAN is Made for IoT", "Electronic Design", Jul. 10, 2017, 5 pp., https://www.electronicdesign.com/industrial-automation/article/21805274/lorawan-is-made-for-iot.

* cited by examiner

INTERNET OF THINGS BASED MODULAR HARDWARE PLATFORM

RELATED APPLICATIONS

This application claims the priority benefit of Indian patent application number 202021056990, filed Dec. 29, 2020, the entire disclosure of which is incorporated herein by reference.

FIELD OF THE INVENTION

The present invention is directed to the Internet of Things (IoT). More particularly, the present invention is directed to an IoT-based modular hardware platform.

BACKGROUND OF THE INVENTION

A Low-Power Wide-Area Network (LoRaWAN) is a type of wireless telecommunication wide-area network designed to allow long range communications at low bit rates among various connected devices, such as sensors operated on batteries. Narrowband Internet of Things (NBIoT), WiFi, Global System for Mobile Communications (GSM), second-, third-, fourth-, and fifth-generation cellular networks (2G, 3G, 4G, and 5G), and Bluetooth Low Energy (BLE) are similar technologies used in the market for Internet of Things (IoT) network implementation. The term IoT refers to the concept of extending internet connectivity beyond conventional computing platforms such as personal computers and mobile devices, and into any range of previously non-internet-enabled physical devices. Embedded with electronics, internet connectivity, and other forms of hardware such as sensors, for example, these devices can communicate and interact with others over the internet, and they can be remotely monitored and controlled. Such devices can access the internet through, for example, an LPWAN access point or gateway.

IoT holds significant promise for delivering social and economic benefits to emerging and developing economies. This includes areas such as sustainable agriculture, streetlights, water quality, metering, parking, healthcare, industrialization, and environmental management, among others.

Smart metering of gas, water and electricity are essential elements of a city environment and services. They affect resident day-to-day life while influencing a city's ability to create an automated metering and payment service. Currently, each design is done uniquely for sensors and partner devices.

However, as these devices and networks have developed, so have different protocols with no one standard emerging. Current LPWAN access points or gateways are dedicated devices operating on a single protocol and within a certain frequency band for the supported devices. Thus, development of an IoT environment can be limited to a particular protocol and devices supporting that protocol. This can present challenges in developing an IoT environment and deploying new devices. Hence, there is a need for improved methods and systems utilizing multiple protocols.

It would be beneficial to have a straightforward platform to connect to a set of non-internet-enabled sensors and like devices.

SUMMARY OF THE INVENTION

A modular hardware platform (modular platform) is provided herein with auto non-internet-enabled (NIE) peripheral device detection capabilities, which enables smart control and monitoring of various types of NIE peripheral devices (NIE devices), such as sensors and meters, that data communicate using a wired communication protocol. More specifically, the modular platform is configured to data communicate with any type of NIE device so that it can receive peripheral device data (NIE data) from the NIE device in any type of wired data communication protocol, and translate the NIE data in the wired communication protocol to one or more different wireless data communication protocols including, without limitation, NBIoT, WiFi, GSM, 2G, 3G, 4G, 5G and BLE protocols. The modular platform is further configured to receive commands wirelessly transmitted from a network server and the like, and translate the wirelessly transmitted commands to the wired communication protocol used by the corresponding NIE device.

In various embodiments, the modular platform includes at least one platform processor and one or more different types of communication modules that are capable of wireless data communication. Each communication module is configured to communicate in one of a plurality of wireless data communication protocols (e.g., NBIoT, WiFi, GSM, 2G, 3G, 4G, 5G and BLE) so that the modular platform can communicate with various types of access points and gateways to establish various IoT networks. In some embodiments, the modular platform includes a LoRaWAN communication module (LoRa module) and a BLE communication module (BLE module). The LoRa module enables the modular platform to wirelessly data communicate with network servers, via a LoRaWAN gateway, and the BLE module enables the modular platform to wirelessly data communicate with mobile devices over BLE. In some embodiments, the BLE module can be integrated with the platform processor. The platform processor hosts programmable firmware, which is configured to allow the modular platform to automatically detect the type of NIE device that is connected to the modular platform. More specifically, the firmware is configured to process various types of NIE data including without limitation serial UART (universal asynchronous receiver-transmitter) data, RS485 (universal communication protocol) data, I2C (Inter-Integrated Circuit) data and SPI (Serial-Parallel Interface) data. Therefore, the modular platform can read NIE data from various types of NIE devices, interpret the NIE device type, interpret the NIE data received from the NIE device, and translate the NIE data to the wireless protocol used by the communication module selected for transmission of the data. The firmware is further configured to enable the modular platform to receive commands wirelessly transmitted from network servers and mobile devices, interpret the commands received from the network server or mobile device, and translate the commands from the wireless protocol used by the network server or mobile device to the wired communication protocol used by the corresponding NIE device.

The LoRa communication module of the modular platform uses a LoRaWan protocol to enable the modular platform to wirelessly communicate with a network server via a LoRaWAN gateway. In other embodiments, the modular platform can additionally or alternatively include a NBIoT communication module, a WiFi communication module, a GSM communication module, and a 2G, 3G, 4G, and/or 5G communication module(s), or any combination thereof, and/or any other type of RF communication module to establish an IoT network and thereby extend internet connectivity to NIE peripheral devices.

As stated earlier, the NIE devices use various types of wired data communication protocols. The wired data communication protocols can include, but are not limited to UART, RS485, I2C and SPI data communication protocols. Therefore, the platform processor is further configured with various types of NIE peripheral interfaces including, without limitation, one or more UART, RS485, SPI, I2C peripheral interfaces, or any combination thereof, which allow the modular platform to data communicate with any NIE device that can be wire-connected to the modular platform. The modular platform further includes various type of connectors for wire connecting the various types of NIE devices thereto. These connectors may include, without limitation, one or more standard DB9-RS485 connectors for connecting one or more NIE devices that data communicate in RS485 to the one or more RS485 interfaces, one or more first 3-Pin standard JST connectors for connecting the one or more NIE devices that data communicate in I2C to the one or more I2C interfaces, one or more 3-Pin standard JST connectors for connecting one or more NIE devices that data communicate in UART to the one or more UART interfaces, and one or more 5-pin standard JST connectors for connecting one or more NIE devices that data communicate in SPI to the one or more SPI interfaces.

In various embodiments, the modular platform uses data encryption to provide secure data communications within the IoT network created by the modular platform. In some embodiments, the data encryption can utilize two-factor secure authorization to establish secure data communications within the IoT network. In some embodiments, the two-factor secure authorization data encryption is an Advanced Encryption Standard (AES) algorithm. In such embodiments, the platform processor, a processor of the LoRa module, and the processor of any other wireless communication module provided in the modular platform each includes data encryption (e.g., AES algorithms) to establish secure data communications. For example, if AES algorithms are used by the modular platform, the platform processor uses its AES algorithm to perform a first level of encryption on the NIE data obtained from the NIE devices and the processor of the LoRa module uses its AES algorithm to first level decrypt the first level encrypted NIE data. The LoRa module then performs a second level of encryption on the NIE device data received from the platform processor, prior to transmitting that data to the network server.

The NIE devices may include, for example, sensors for temperature, humidity, air quality and pressure.

In various embodiments, the modular platform comprises: a processor; and a first communication module configured to data communicate in a first wireless communication protocol with the network server. The processor is configured to detect the peripheral device type of each of the one or more peripheral devices, obtain peripheral device data from the one or more peripheral devices, interpret the peripheral device data obtained from each of the one or more of the peripheral devices in any one of the different wired data communication protocols, and translate the peripheral device data in the wired communication protocol of each of the one or more of the peripheral devices, to the first wireless data communication protocol of the first communication module.

In some embodiments, the first communication module comprises a LoRaWAN (Low Power Wide Area network) communication module which data communicates in a LoRaWan protocol.

In some embodiments, the modular platform further comprises a second communication module configured to data communicate in a second wireless communication protocol with a wireless device in a second wireless data communication network.

In some embodiments, the second communication module is integrated with the processor.

In some embodiments, the second wireless communication protocol of the second wireless communication module comprises BLE, NBIoT, WiFi, GSM, 2G, 3G, 4G, 5G, or any combination thereof.

In some embodiments, the processor is further configured to translate the peripheral device data in the wired communication protocol to the second wireless data communication protocol of the second communication module.

In some embodiments, the modular platform further comprises a UART interface, a RS485 interface, a SPI interface, a I2C interface, or any combination thereof, in data communication with the processor for obtaining the peripheral device data from each of the one or more of the peripheral devices in the any one of the different wired data communication protocols.

In some embodiments, the modular platform further comprises a connector for wire connecting each of the one or more peripheral devices to the modular platform.

In some embodiments, the connector is configured to connect a RS485 peripheral device, a I2C peripheral device or a UART peripheral device, or a SPI peripheral device.

In some embodiments, the processor is configured with an encryption algorithm for encrypting the translated peripheral device data before transmitting it to the first communication module.

In some embodiments, the first communication module includes a processor configured with the encryption algorithm for: decrypting the encrypted translated peripheral device data; and encrypting the decrypted translated peripheral device data before wirelessly transmitting it in the first wireless communication protocol to the server.

In some embodiments, the processor is configured with an encryption algorithm for encrypting the translated peripheral device data before the second communication module transmits it in the second wireless communication protocol to the wireless device.

In some embodiments, the processor is configured with an encryption algorithm for encrypting the translated peripheral device data before transmitting it to the second communication module.

In some embodiments, the second communication module includes a processor configured with the encryption algorithm for: decrypting the encrypted translated peripheral device data; and encrypting the decrypted translated peripheral device data before wirelessly transmitting it in the second wireless communication protocol to the wireless device in the wireless data communication network.

In some embodiments, the one or more peripheral devices comprise sensor and/meters.

In some embodiments, the modular platform further comprises a second communication module configured to data communicate in a second wireless communication protocol with a wireless device in a second wireless data communication network, wherein the first wireless communication protocol of the first communication module comprises one of LoRaWAN, BLE, NBIoT, WiFi, GSM, 2G, 3G, 4G, 5G and wherein the second communication protocol of the second wireless communication module comprises one of LoRaWAN, BLE, NBIoT, WiFi, GSM, 2G, 3G, 4G, 5G, which is different from the communication protocol of the first communication module.

In various embodiments, a method for remote control and monitoring of one or more peripheral devices from a server in a first wireless data communication network, each of the one or more peripheral devices communicating in one of a plurality of different wired communication protocols, the method comprises: detecting, with a processor, the peripheral device type of one of the one or more peripheral devices; obtaining, with the processor, peripheral device data from the one of the one or more peripheral devices; interpreting, with the processor, the peripheral device data obtained from the one of the one or more of the peripheral devices in the one of the plurality of different wired data communication protocols; translating, with the processor, the peripheral device data in the one of the plurality of different wired data communication protocols, to a first wireless data communication protocol of a first communication module; transmitting, with the processor, the peripheral device data in the first wireless communication protocol to the first wireless communication module; and transmitting, with the first communication module, the peripheral device data in the first wireless communication protocol to the server.

In some embodiments of the method further comprises: detecting, with the processor, the peripheral device type of one or a second one of the one or more peripheral devices; obtaining, with the processor, peripheral device data from the one or the second one of the one or more peripheral devices; interpreting, with the processor, the peripheral device data obtained from the one or the second one of the one or more of the peripheral devices in the one of the plurality of different wired data communication protocols; translating, with the processor, the peripheral device data in the one of the plurality of different wired data communication protocols, to a second wireless data communication protocol of a second communication module; transmitting, with the processor, the peripheral device data in the second wireless communication protocol to the second wireless communication module; and transmitting, with the second communication module, the peripheral device data in the second wireless communication protocol to a mobile device.

In some embodiments, if the first wireless communication module fails the method further comprises: translating, with the processor, the peripheral device data in the one of the plurality of different wired data communication protocols, to a second wireless data communication protocol of a second communication module which is operative as a fail-safe communication module; transmitting, with the processor, the peripheral device data in the second wireless communication protocol to the second wireless communication module; transmitting, with the second communication module, the peripheral device data in the second wireless communication protocol to the server; and alerting a user of the modular platform of the failure of the first wireless communication module.

BRIEF DESCRIPTION OF THE DRAWINGS

FIG. 4A is a flowchart which shows how the firmware hosted on the processor of the modular platform enables the modular platform to perform auto-identification of data gathered by the NIE peripheral devices according to an exemplary embodiment of the present invention and FIGS. 4B-4D are flowcharts which show how the firmware hosted on the platform processor of the modular hardware platform, processes alerts received from active NIE peripheral devices according to an exemplary embodiment of the present invention.

DETAILED DESCRIPTION

Figure 1:
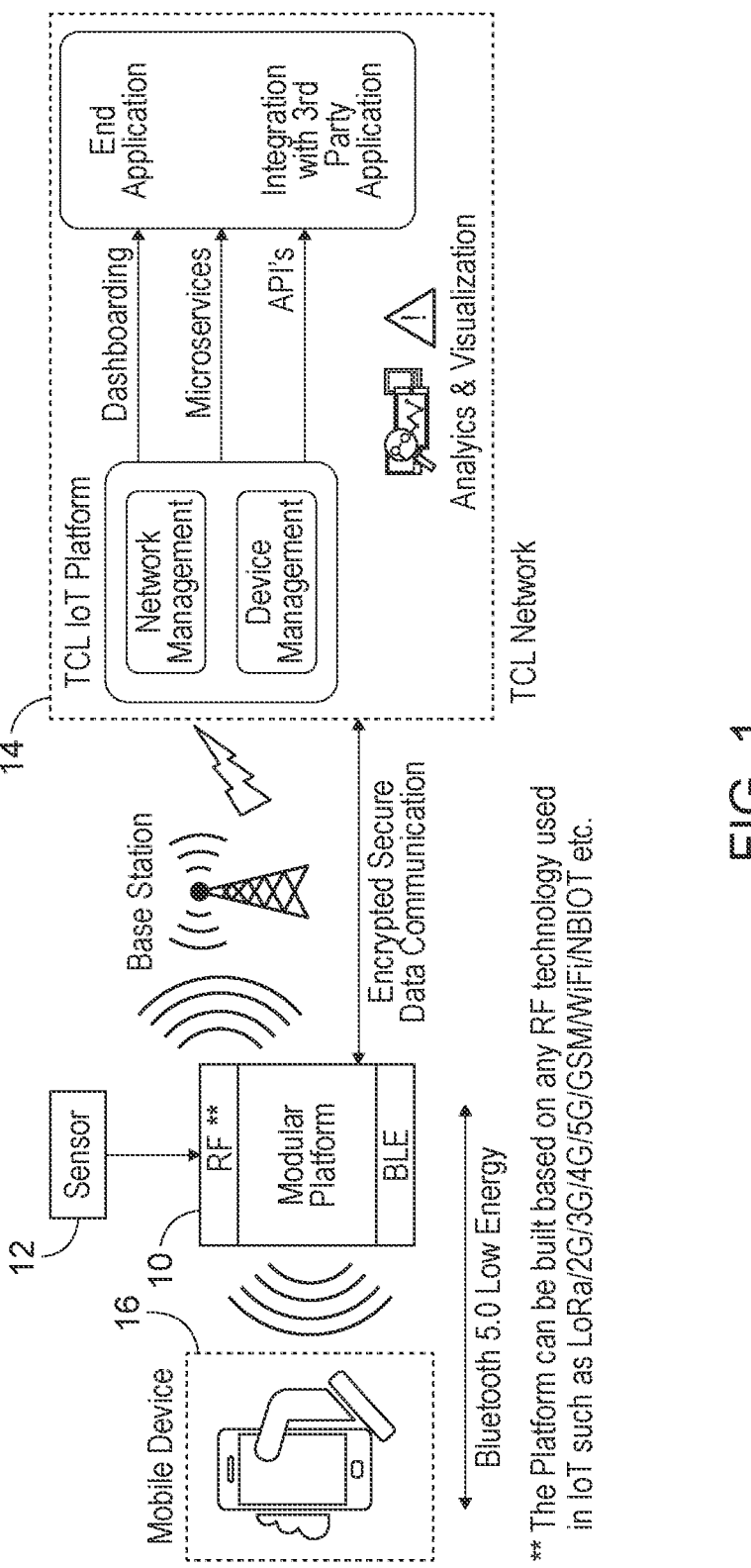
FIG. 1 is a block diagram of an exemplary embodiment of an IoT network, which includes a modular hardware platform of the present invention.

Referring now to the drawing figures, wherein like reference numbers refer to like elements throughout the several views, there is shown in FIG. 1 an exemplary embodiment of an IoT network formed by the modular hardware platform 10 (modular platform 10) of the present invention. The modular platform 10 is configured to wire-connect and data communicate with a plurality of non-internet-enabled (NIE) peripheral devices 12 (for example, temperature, humidity, air quality and/or pressure sensors, and various types of meters), where each NIE peripheral device 12 (NIE device 12) collects data (NIE data) in one of a plurality of wired communication protocols, including without limitation a UART (universal asynchronous receiver-transmitter) protocol, a RS485 (universal communication protocol) protocol, a I2C (Inter-Integrated Circuit) protocol and a SPI (Serial-Parallel Interface) protocol. Examples of the NIE devices 12 include, for example:

Energy Meters, which typically use a universal RS485 interface;

Certain types of Accelerometers, GPSs, and Environmental Sensors (Temperature, Humidity, Air Quality Index), which use a I2C interface;

Certain other types of Accelerometers, GPSs, and Environmental Sensors (Temperature, Humidity, Air Quality Index), which use an SPI interface; and Current Sensors, Pressure Sensors, and certain further types of Environmental Sensors (Temperature, Humidity, Air Quality Index), which use a UART interface.

The modular platform 10 is further configured to automatically detect various types of NIE devices 12 that are wire-connected to the modular platform 10, read NIE data collected by each of the detected NIE devices 12, interpret the NIE data, translate the NIE data into a wireless data communication protocol, such as LoRaWAN, NBIoT, WiFi, GSM, 2G, 3G, 4G, 5G and BLE, encrypt the NIE data, and wirelessly transmit the encrypted NIE data to a network server 14 or a mobile device 16, where the NIE data can be decrypted and interpreted.

The modular platform 10 is further configured to receive encrypted NIE and modular platform commands in wireless protocols from the network server 14 and the mobile device 16. In the case of an encrypted NIE command, the modular platform 10 is further configured to decrypt NIE command, translate NIE commands into a wired data communication protocol and transmit NIE command to a corresponding one of the NIE devices 12. In the case of an encrypted modular platform command, the modular platform 10 is further configured to decrypt the modular platform command and perform the task required by the command.

As shown in FIG. 1, the network server 14 is part of a management network that may include various other components and/or functions, including, for example:

Device Management—to view/configure NIE devices remotely and generate event logs and reports.

Dashboarding—to project the NIE devices on a user application as an object to enable user to locate/view/configure with ease.

Microservices—Value added services integration such as automated billing and Application Programming Interfaces (APIs). The APIs operate as a communicating module between the network server 14 and end application, enabling the end application to view/configure the NIE device parameters through the network.

End Application—end applications can be categorized into 2 types:

1) Web Application, which is used to view/configure the NIE device from a web interface/software installed on a computer.

2) Mobile application, which is installed on a user mobile (iOS and Android) and can be used to view/configure the NIE device.

Integration with Third Party Application—The end application can be linked to a third party smart home application such as Google Home, Alexa, IFTTT for voice assisted services.

Figure 2A:
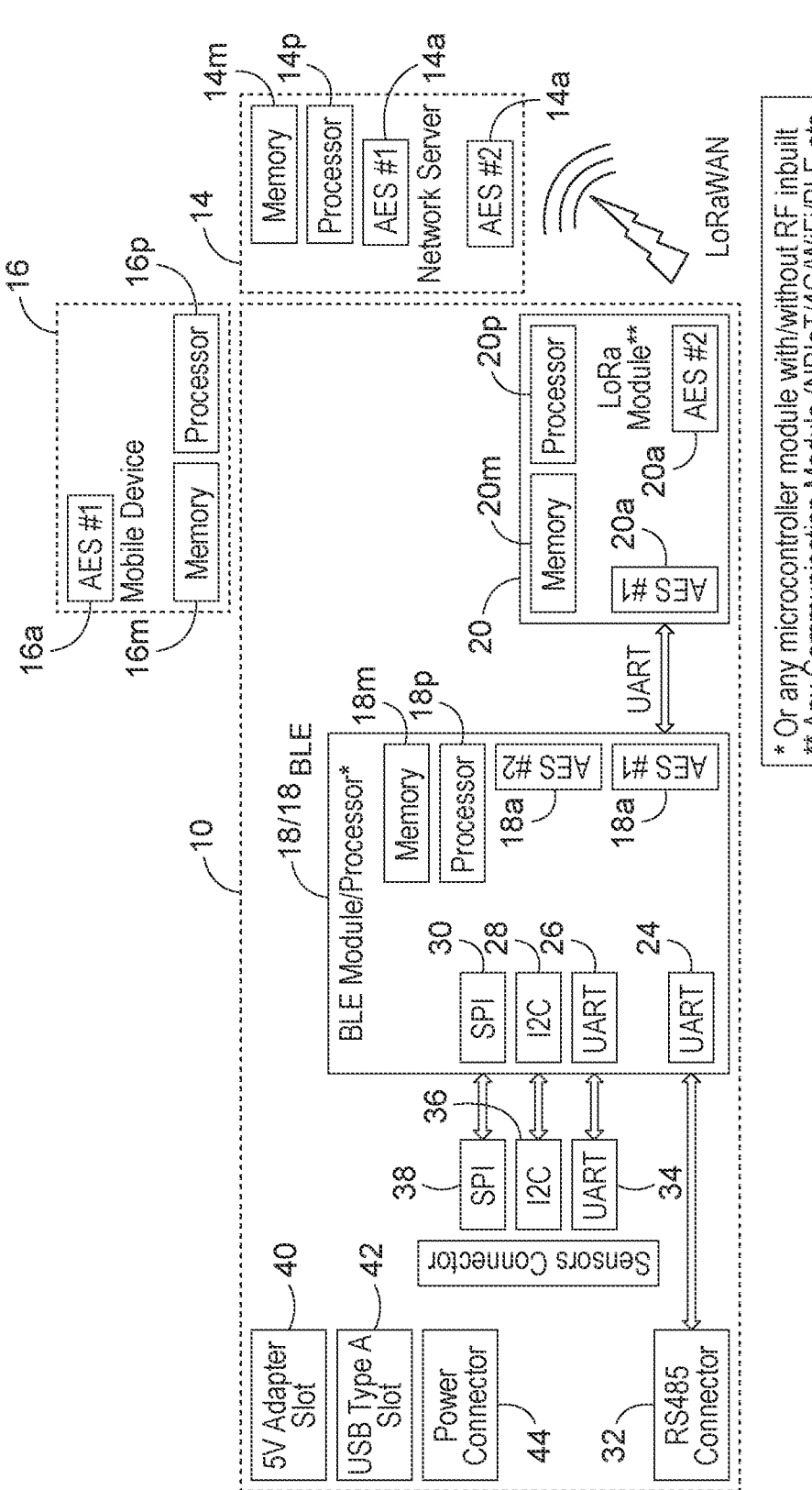
FIG. 2A is a block diagram of the modular hardware platform according to an exemplary embodiment of the present invention.

The modular platform 10 will now be described in greater detail with reference first to FIG. 2A, which illustrates an exemplary embodiment of the modular platform 10. As illustrated in FIG. 2A, the modular platform includes a processor 18 (platform processor 18) with a program memory 18$m$, a Low Power Wide Area Network communication module 20 (LoRa module 20), and a Bluetooth Low Energy communication module 18$_{BLE}$ (BLE module 18$_{BLE}$). The LoRa module 20 includes a processor 20$p$ with a program memory 20$m$. In the embodiment illustrated in FIG. 2A, the BLE module 18$_{BLE}$ is integrated with the platform processor 18. In other embodiments, the BLE module can be separately provided (not shown) instead of being integrated with the platform processor 18. In such embodiments, the BLE module would include a processor with a program memory. In further embodiments, one or more additional or other types of communication modules, each having a processor with a program memory, can be provided to communicate in various other types of wireless data communication protocols, such as NBIoT, WiFi, GSM, 2G, 3G, 4G, and 5G.

Referring still to FIG. 2A, the program memory 18$m$ of the platform processor 18 contains programmable firmware (firmware), which enables the platform processor 18 to operate as a bridge between the communication modules (e.g., the LoRa module 20 and BLE module 18$_{BLE}$) and each of the plurality of NIE devices 12 (FIG. 1), which are wire-connected to the modular platform 10.

In the embodiment illustrated in FIG. 2A, the platform processor 18 and the processor 20$p$ of the LoRa module 20 each includes AES algorithms 18$a$ and 20$a$, respectively, built into their respective program memories 18$m$ and 20$m$ for establishing two-factor secure data communications with the network server 14 and the mobile device 16, as detailed further on.

The platform processor 18 illustrated in FIG. 2A uses its AES algorithm 18$a$ to perform: 1) first level encryption on the NIE data received from the NIE devices 12; 2) first level decryption on first level encrypted NIE device or platform commands received from the mobile device 16; and 3) second level decryption on second level encrypted NIE device and platform commands received from the LoRa module 20, which originate at the network server 14.

The LoRa communication module 20 illustrated in FIG. 2A uses its AES algorithm 20$a$ to perform: 1) first level decryption on the first level encrypted NIE data received from the platform processor 18; 2) second level encryption on the first level decrypted NIE data; and 3) first level decryption on the first level encrypted NIE device and platform commands received from the network server 14. The BLE module 18$_{BLE}$ integrated into the platform processor 18 use the platform processor's AES algorithms 18$a$ to perform: 1) first level encryption on NIE data to be transmitted to the mobile device 16; and 2) first level decryption on the first level encrypted NIE device and platform commands received from the mobile device 16.

In addition, the network server 14 illustrated in FIG. 2A includes a processor 14$p$ with AES algorithms 14$a$ built into its program memory 14$m$ for establishing two-factor secure data communications with the modular platform 10. The network server 14 uses its AES algorithm 14$a$ to perform: 1) second level decryption on second level encrypted NIE data received from the LoRa communication module 20; and 2) first level encryption on NIE device and platform commands to be transmitted to the NIE devices 12 or the modular platform 10.

The mobile device 16 illustrated in FIG. 2A includes a processor 16$p$ with AES algorithms 16$a$ built into its program memory 16$m$ for establishing two-factor secure data communications with the modular platform 10. The mobile device 16 uses its AES algorithm 16$a$ to perform: 1) first level decryption on first level encrypted NIE data received from the BLE communication module integrated into the platform processor 18; and 2) first level encryption on NIE device and platform commands to be transmitted to the NIE devices 12.

In embodiments wherein the BLE module is separate from the platform processor (not shown), the BLE module's processor includes AES algorithms built into its program memory for establishing two-factor secure data communications with the mobile device 16. The separately provided BLE module uses its AES algorithm to perform: 1) first level decryption on the first level encrypted NIE data received from the platform processor 18; 2) second level encryption on the first level decrypted NIE data; and 3) first level decryption on the first level encrypted NIE device and platform commands received from the mobile device 16. In such embodiments, the mobile device 16 AES algorithm would also perform second decryption on second level encrypted NIE data received from the separately provided BLE module.

The first and second levels of encryption are the same encryption method performed twice. This method prevents the modular platform 10 from being physically cyber-attacked and cyber-attached from the World Wide Web. Specifically, the platform processor to LoRa module AES encryption will prevent hackers from hacking into the data by physically accessing the modular platform 10. The LoRa module to network server AES encryption will prevent hackers from hacking into the modular platform 10 using a computer application.

The platform processor 18 data communicates with the communication modules (e.g., the LoRa module 20 or a separately provided BLE module) using serial UART or any other wired communication protocol.

The NIE device commands transmitted to the NIE devices 12 from the network server 14 and the mobile device 16, via the modular platform 10, include, without limitation, requests to read NIE data, such as temperature, pressure, humidity, etc. The platform commands transmitted to the modular platform 10 from the network server 14 and the mobile device 16 include, without limitation, requests to read modular platform data, such as battery percentage (for example, in embodiments where the modular platform 10 is powered by a battery).

The modular platform 10 further includes one or more various types of NIE peripheral device interfaces (NIE interfaces) for communicating with the various types of NIE devices 12. In the embodiment illustrated in FIG. 2A, the modular platform 10 includes an RS485 interface 24, a UART interface 26, an I2C interface 28, and an SPI interface 30.

The modular platform 10 further includes one or more various types of connectors for wire-connecting the various types of NIE devices 12 to the platform 10. In the embodiment illustrated in FIG. 2A, the modular platform 10 includes a standard DB9-RS485 connector 32 for connecting an RS485 NIE device, a first 3-pin standard JST connector 34 for connecting a UART NIE device, a second 3-pin standard JST connector 36 for connecting an I2C NIE device, and a 5-pin standard JST connector 38 for connecting an SPI NIE device. The DB9-RS485 connector 32 is data communicates with the RS485 interface 24, the first 3-pin standard JST connector 34 is data communicates with the UART interface 26, the second 3-pin standard JST connector 36 is data communicates with the I2C interface 28, and the 5-pin standard JST connector 38 is data communicates with the SPI interface 30.

The modular platform 10 further includes one or more various types of slots or connectors for connecting the modular platform 10 to one or various types of power sources. In the embodiment illustrated in FIG. 2A, the modular platform 10 includes a slot 40 for connecting a standard 5V adaptor, a USB type A slot 42 for connecting to a power source via USB type A connector, and a 3-pin standard JST connector 44 for connecting a battery or other power source.

Figure 2B:
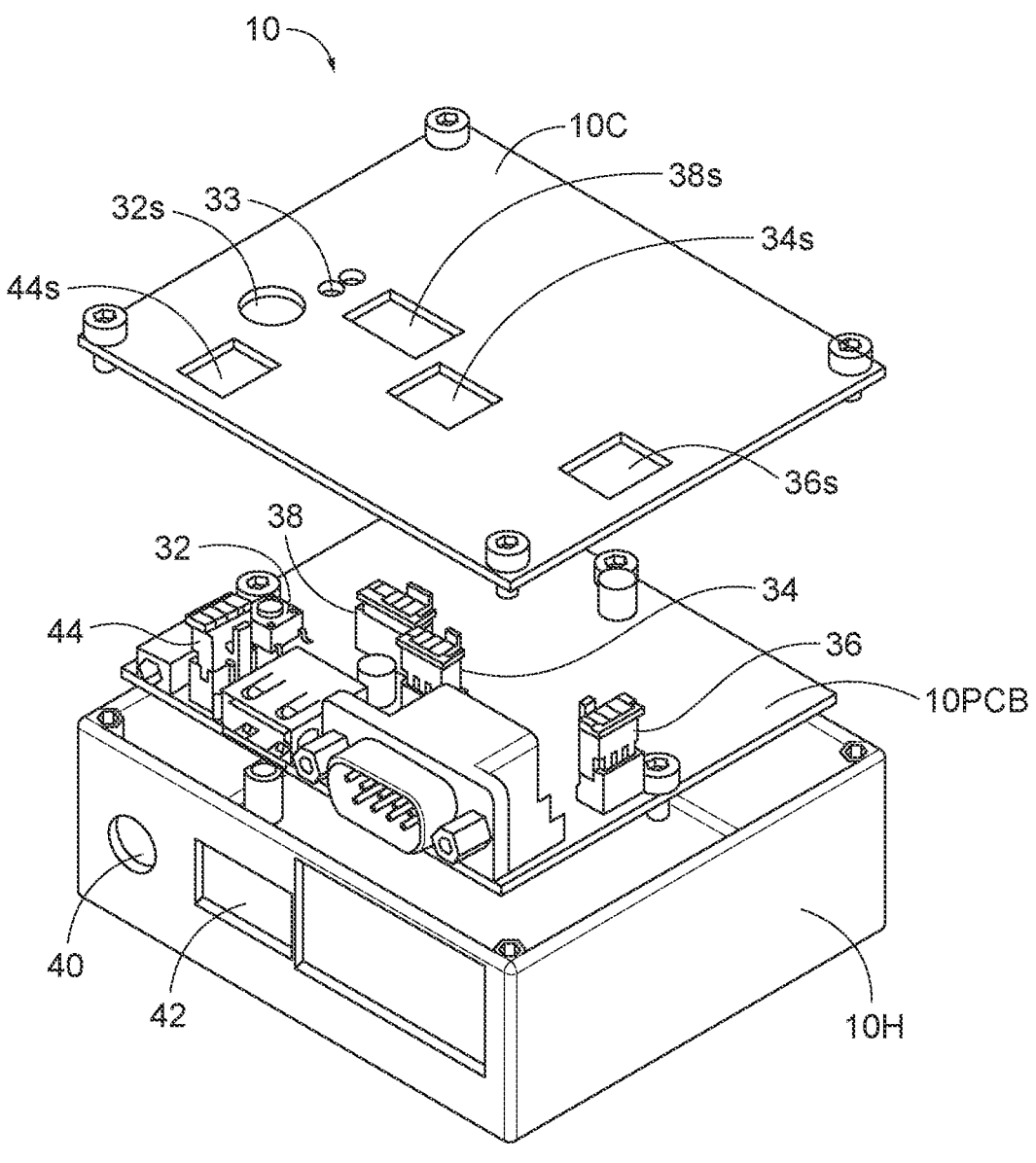
FIG. 2B is an exploded view of the modular hardware platform according to an exemplary embodiment of the present invention.

As illustrated in FIG. 2B, in various embodiments, the modular platform 10 includes an open housing 10h and a cover 10c for closing the open housing 10h. The housing 10h contains a printed circuit board 10_{PCB} on which the platform processor 18, the LoRa module 20, the NIE device connectors 32, 34, 36, and 38, and the power connector 44, are mounted. The housing 10h also includes the slot 40 for connecting a standard 5V adaptor and the USB type A slot 42. The cover 10c includes slots 32s, 34s, 36s, and 38s for accessing the NIE device connectors 32, 34, 36, and 38 mounted on the printed circuit board 10_{PCB}, and a slot 33s for a status LED.

As mentioned earlier, each of the plurality of NIE devices 12 collect data in one of a plurality of wired data communications protocols (e.g., UART, SPI, I2C, and RS485). The firmware hosted by the platform processor 18 includes various protocols and applications built therein to process various types of NIE data collected by the NIE devices 12

(e.g., UART serial data, SPI data, I2C data and RS485 data). These protocols and applications built into the firmware enable the platform processor 18 to automatically detect any type of NIE device (e.g., an RS485 NIE device, a UART NIE device, an I2C NIE device, an SPI NIE device) that is wire connected to the modular platform 10, read NIE data collected by each of the NIE devices 12, interpret the NIE device type (e.g., an RS485 NIE device, a UART NIE device, an I2C NIE device, an SPI NIE device), interpret the type of data received from the NIE device 12 (e.g., temperature, pressure, humidity, etc.), translate the NIE data (e.g., UART serial data, SPI data, I2C data and RS485 data) into the wireless communication protocol used by the communication module (e.g., the LoRaWaN for the LoRa module 20, BLE for the BLE module 18_{BLE}, etc.) selected for transmission of the NIE data to the network server 14 or mobile device 16, and encrypt the NIE data.

If the NIE data (i.e., NIE device type and interpreted NIE data) has been translated into the LoRaWAN communication protocol, the LoRa module's processor 20p is configured to decrypt the NIE data received from the platform processor 18 and then encrypt it again before transmitting it to the network server 14. Once encrypted, the LoRa module's processor 20p is further configured to place the NIE data into a LoRaWAN payload. The LoRa module then wirelessly transmits the encrypted LoRaWAN payload containing the NIE data to the network server 14, via a LoRaWan gateway (not shown). The processor 14p of the network server is configured to decrypt the LoRaWAN payload so that applications on computers connected to the network server 14 can now access the NIE data.

If the NIE data has been translated into the BLE communication protocol, the platform processor 18 is configured to place the encrypted NIE data into a BLE payload and wirelessly transmit the encrypted BLE payload containing the BLE data to the mobile device 16. The processor 16p of the mobile device 16 is configured to decrypt the BLE payload so that it can access the NIE data.

Figure 3A:
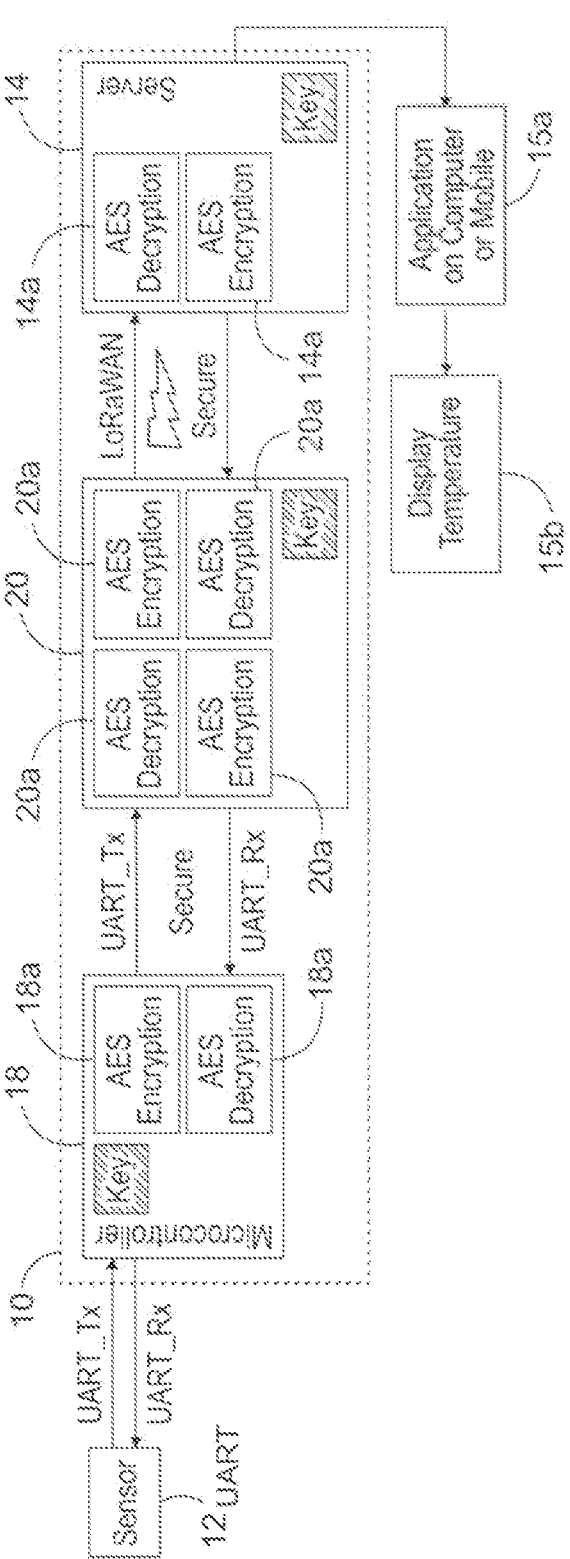
FIGS. 3A and 3B are block diagrams which show the flow of NIE peripheral device data and commands between a NIE peripheral device, such as a UART-based sensor, and a network server, via the modular platform, according to an exemplary embodiment of the present invention.
Figure 3B:
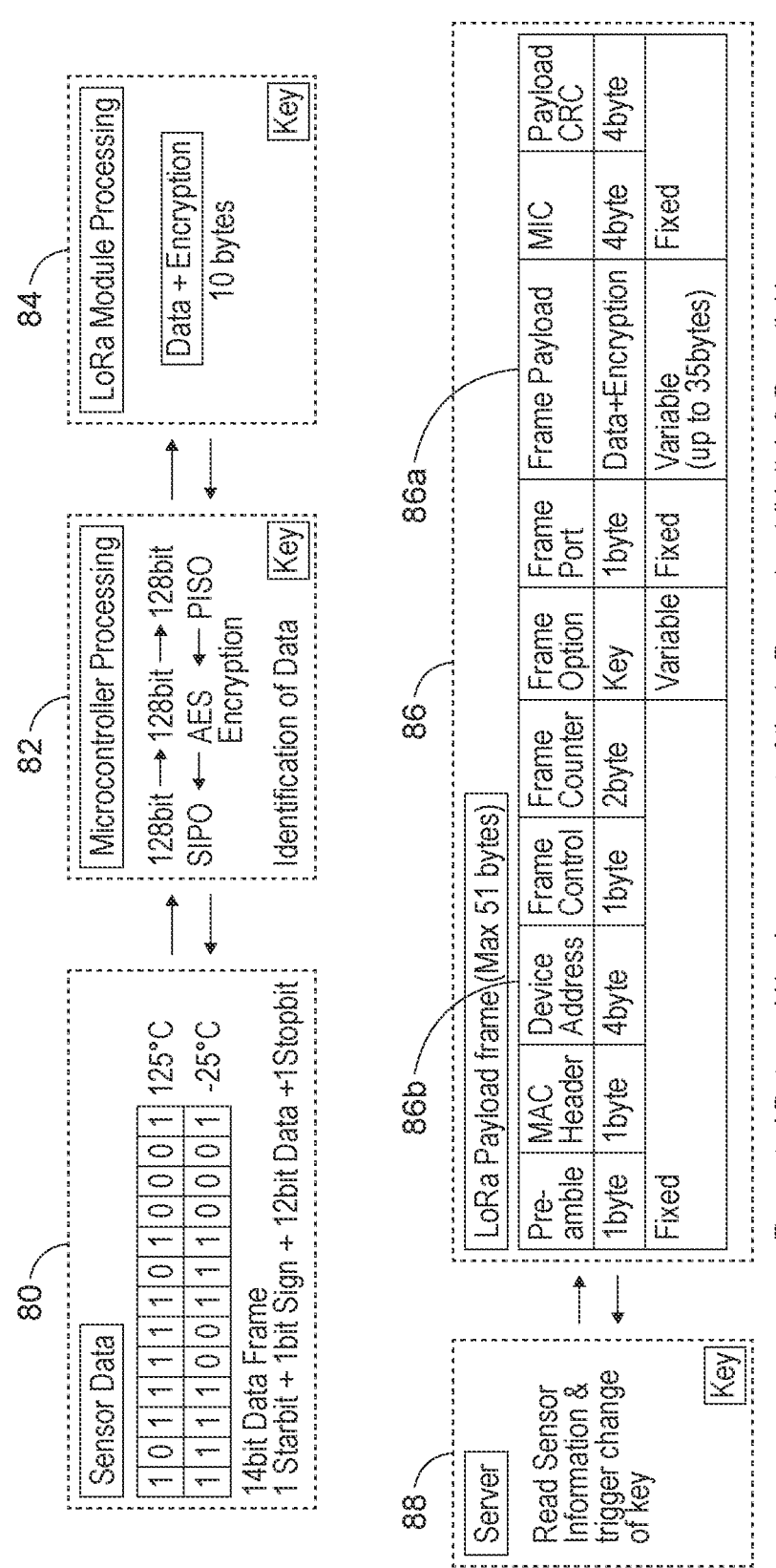

FIGS. 3A and 3B are block diagrams, which illustrate the flow of NIE data between a NIE device wire connected to the modular platform 10 and the network server 14. For ease of illustration only, the NIE device, the NIE data, the NIE device command depicted in FIG. 3A comprise a UART temperature sensing device 12_{UART}, UART temperature data, and a UART command to sense temperature, respectively. Further, the example of a UART-based NIE data transmission over a LoRaWAN network is explained for illustration purposes only. Other embodiments of the modular platform may contain any RF protocol and required network architecture for realization as described above in paragraphs 0008 and 0009.

Flow of UART Data from the UART Device 12_{UART} to the Network Server 14

The platform processor 18, which contains the firmware in its program memory 18m, automatically detects the UART temperature sensing device 12_{UART} (UART device 12_{UART}), which is actively collecting temperature data and which is connected to the modular platform 10, via the UART connector 36 and the UART interface 26 (FIG. 2A). Because the temperature data is received on the UART interface 26, the platform processor 18 is able to determine that the collected data is from a UART type of NIE device (i.e., UART device 12_{UART}). Once the NIE device has been identified as a UART device, the platform processor 18 selects and executes conventional protocol(s) and application(s) provided by the firmware for reading temperature data in the UART protocol, interpreting temperature data in the UART protocol, and translating the temperature data in the UART protocol into the LoRaWAN protocol. Once the temperature data 80 (FIG. 3B) has been read, interpreted, and is translated into the LoRaWAN wireless protocol by the platform processor 18, the platform processor 18 uses its AES algorithm 18a built into its program memory 18m to apply a first level of AES encryption 82 (FIG. 3B) to the temperature data, which is now in the LoRaWAN protocol, and embeds an encryption key into the first level AES encrypted temperature data. The platform processor 18 then transmits the first level AES encrypted temperature data in the LoRaWAN protocol to the LoRa module 20 using a serial UART transmission method.

The LoRa module 20 first level decrypts the first level AES encrypted temperature data in the LoRaWAN protocol, received from the platform processor 18 with the LoRa module's AES algorithm 20a built into the program memory 20m of its processor 20p, and the key embedded in the first level AES encrypted temperature data in the LoRaWAN protocol, so that it can read the temperature data in the LoRaWAN protocol. Next, the LoRa module 20 uses its AES algorithm 20a to apply a second level of AES encryption 84 (FIG. 3B) to the temperature data in the LoRaWAN protocol and embeds the same encryption key into the second level AES encrypted temperature data in the LoRaWAN protocol. Then, the LoRa module 20 places the second level AES encrypted temperature data in the LoRaWAN protocol into a LoRa payload, which has a payload structure 86 shown in FIG. 3B. As illustrated in FIG. 3B, only the frame payload section 86a and device address 86b are configured based on the NIE device type (e.g., UART temperature sensing device) and NIE data (e.g. temperature). Thereafter, the LoRa module 20 transmits LoRa payload which contains the second level AES encrypted temperature data in the LoRaWAN protocol to the network server 14 via a LoRaWAN gateway (not shown).

The LoRa payload containing the second level AES encrypted temperature data in the LoRaWAN protocol is received at the network server 14. The network server 14 uses its AES algorithm 14a built into the program memory 14m of its processor 14p and the encryption key embedded in the second level AES encrypted temperature data in the LoRaWAN protocol to second level decrypt the temperature data contained in the received LoRa payload, so that it can read and interpret the temperature data 88 (FIG. 3B). The network server can then transmit the temperature data to an application running of a computer or a mobile device 15a for ultimate presentation on a display 15b.

Flow of Commands from the Network Server 14 to the UART Device 12$_{UART}$

The network server 14 uses its AES algorithm 14a built into the program memory 14m of its processor 14p to first level encrypt a "sense temperature" command (command) in a LoRaWAN protocol and embed an encryption key into the first level AES encrypted command in the LoRaWAN protocol. The network server then places the first level AES encrypted command in the LoRaWAN protocol into a LoRaWAN payload and transmits it to the LoRa module 20 of the modular platform 10 via a LoRaWAN gateway (not shown).

The LoRa module 20 first level decrypts the first level AES encrypted command in the LoRaWAN protocol, which is contained in the LoRa payload received from the network server 14, using the LoRa module's AES algorithm 20a that is built into the program memory 20m of its processor 20p, and the key embedded in the first level AES encrypted command in the LoRaWAN protocol, so that it can read the command. Next, the LoRa module 20 uses its AES algorithm 20a to apply a second level of AES encryption to the command in the LoRaWAN protocol and to embed the same encryption key into the second level AES encrypted command in the LoRaWAN protocol. Then, the LoRa module 20 transmits the second level AES encrypted command in the LoRaWAN protocol to the platform processor 18 using a serial UART transmission method.

The platform processor 18 uses its AES algorithm 18a built into its program memory 18p and the encryption key embedded in the second level encrypted command in the LoRaWAN protocol received from the LoRa module 20, to second level decrypt the command in the LoRaWAN protocol. The platform processor 18 then selects and executes conventional protocol(s) and application(s) provided by the firmware for reading, interpreting, and translating the command in the LoRaWAN protocol into the UART protocol. Once the command has been read, interpreted, and is translated into the UART protocol, the platform processor 18 transmits the command to the UART device 12$_{UART}$, via the UART interface 26 and the UART connector 36 (FIG. 2A).

Figure 4A:
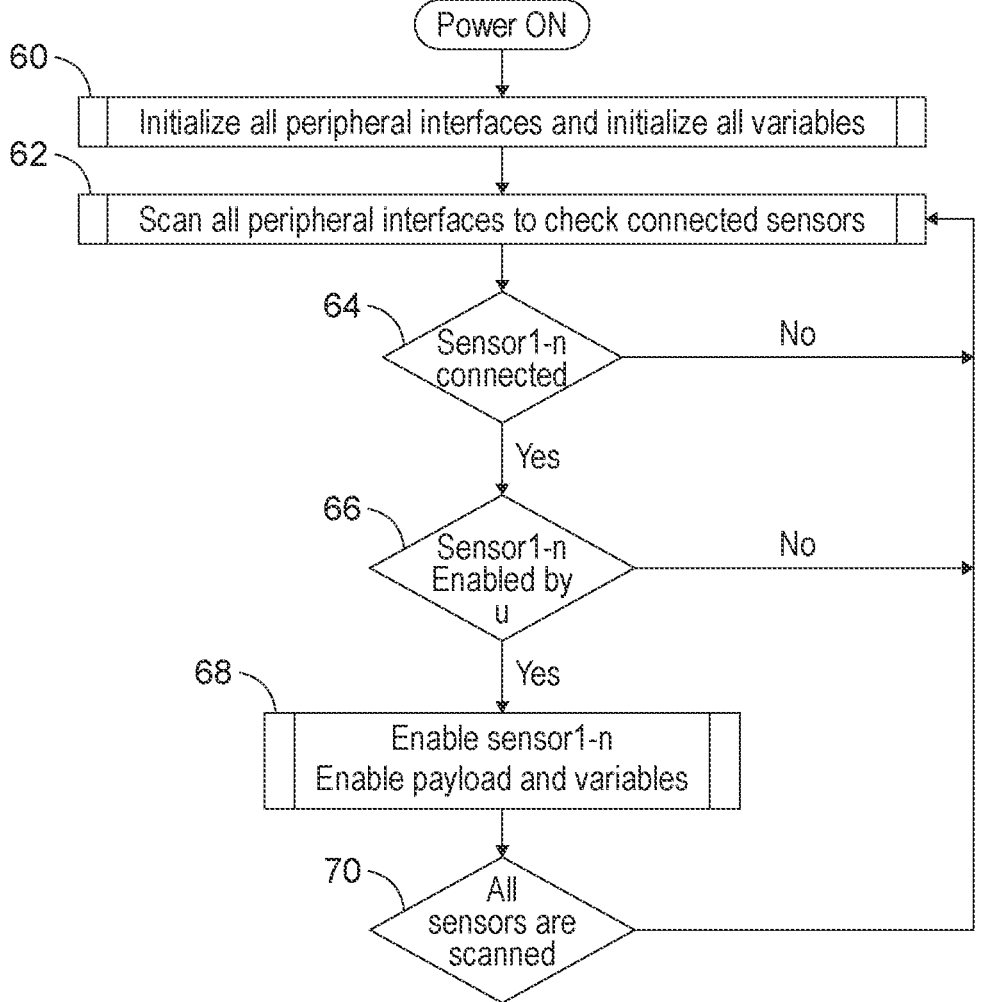
FIGS. 4A-4D are flowcharts depicting the operation of the modular hardware platform, where

FIG. 4A is a flowchart which shows how the programmable firmware hosted on the platform processor 18 of the modular platform 10 enables the modular platform 10 to automatically detect the type of NIE device that is wired connected to the modular platform 10 and automatically identify NIE data. Turning first to box 60, once the modular platform 10 powers on, the platform processor 18 initializes all NIE interfaces 24, 26, 28, 30 and initializes all their variables (assigns initial values to the variables). In box 62, the platform processor 18 scans all the NIE interfaces 24, 26, 28, 30 to check for connected NIE devices and to read whether any data is being transmitted from any of the connected NIE devices 12. In box 64, the platform processor 18 checks each NIE interface 24, 26, 28, 30 to determine on which of the NIE device interfaces 24, 26, 28, 30, a NIE device 12 is connected to the modular platform 10 where "n" in box 64 designates the maximum number of NIE interfaces, e.g., 4. This process enables the platform processor 18 to identity the type of NIE device 12 (e.g., an RS485 NIE device, a UART NIE device, an I2C NIE device, or an SPI NIE device), which is connected to the modular platform 10 and is active. In box 66, each identified NIE device 12 is enabled full time by the platform processor 18 ("u" in box 66 designates the platform processor 18) and in box 68 reaches a state C (FIGS. 4B-4D—state of usual task flow) where, for each enabled NIE device 12, a payload (FIG. 3B—data to be transmitted) and variables are enabled by the processor of the communication module (e.g., the processor 20p of the LoRa module creates a payload structure 86 by populating a device address 86b and Frame payload 86a, as shown in FIG. 3B). The processes of boxes 62, 64, 66, and 68 are repeated in until all the connected NIE devices 12 are scanned in box 70.

Figure 4B:
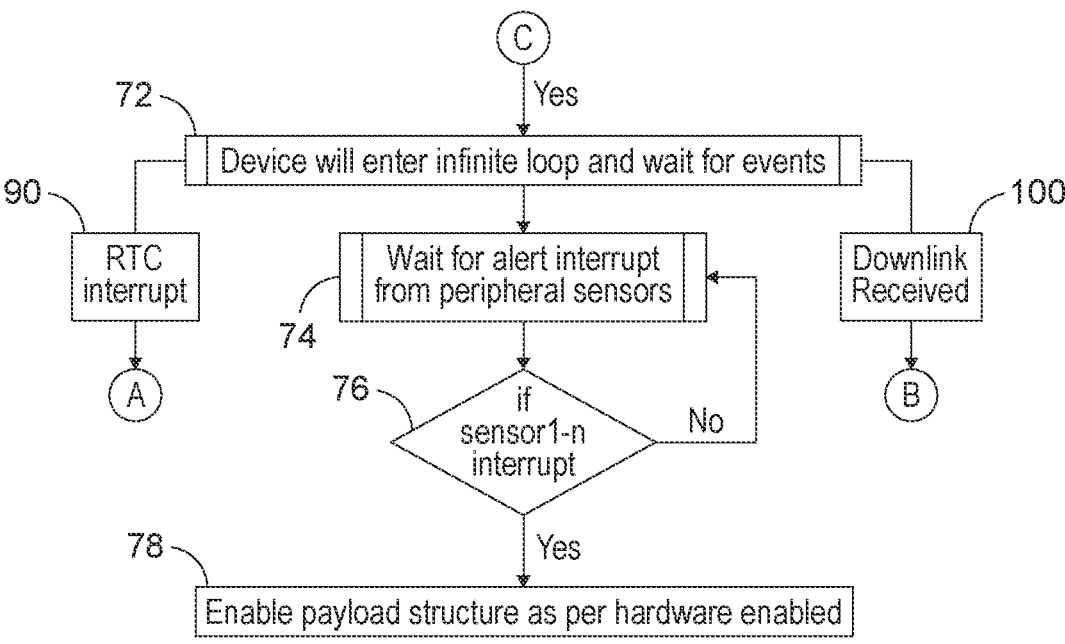
Figure 4C:
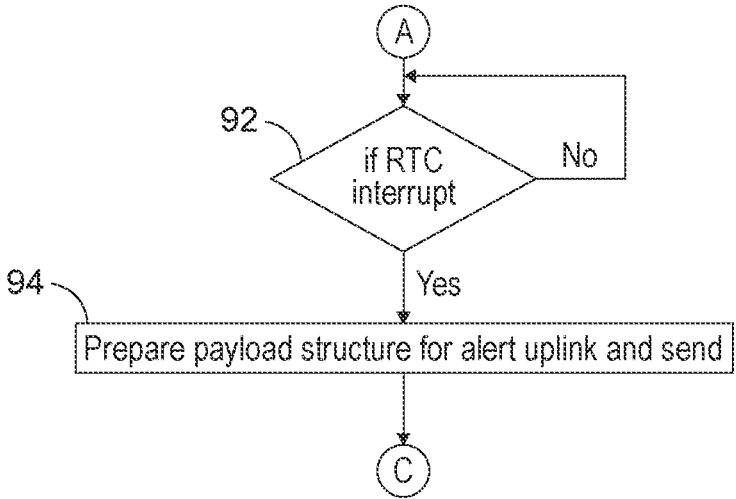
Figure 4D:
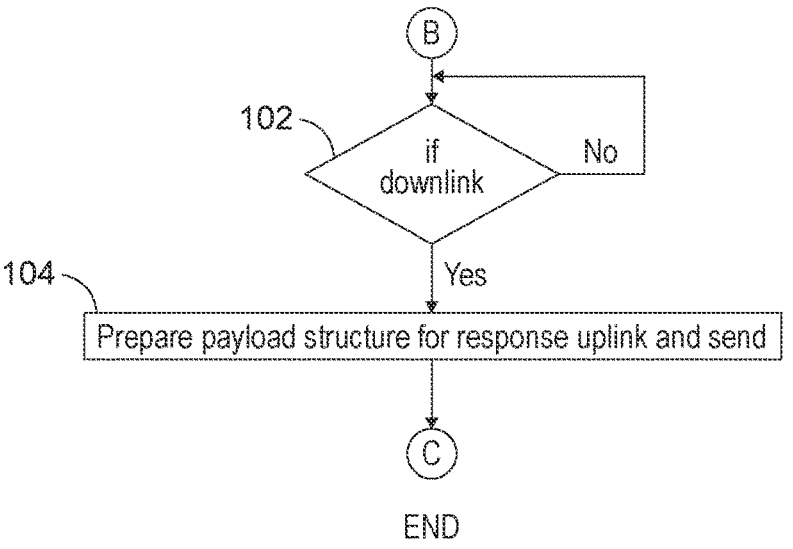

FIGS. 4B-4D are flowcharts which show how the firmware hosted on the platform processor 18 of the modular platform 10 processes alerts received from the NIE devices 12. In box 72 of FIG. 3B, the platform processor 18 of the modular platform 10 (now in state C) enters an infinite loop (boxes 74 and 76 of FIG. 4B) where it waits in box 74 of FIG. 4B for an alert interrupt from the NIE devices 12. If an alert is received in box 76 of FIG. 4B, the processor of the communication module (e.g., LoRa module 20) enables a payload structure 86 (FIG. 3B) in box 78 of FIG. 4B, as per the hardware (NIE device 12) that was enabled in box 66.

In box 92 of FIG. 4C, if some other interrupt such as an Real Time Clock (RTC) interrupt 90 of FIG. 4B or reset is received in the platform processor 18 in box 94 of FIG. 4C from one of the NIE devices 12, while the platform processor 18 is in the infinite loop waiting for NIE device events in box 72 of FIG. 4B (state C), the platform processor 18 moves to state A as shown in FIG. 4C and processes that interrupt as necessary according the process described earlier in FIG. 3A because an interrupts or reset has a higher priority for the platform processor 18 than state C. After completion of the task, the platform processor 18 resumes to state C in FIG. 4B.

On the other hand, in box 102 of FIG. 4D, if some query downlink 100 (FIG. 4B) is received from the network server 14 to perform some task, while the platform processor 18 (FIG. 3A) is in the infinite loop waiting for peripheral device events in box 72 of FIG. 4B (state C), the platform processor 18 goes into state B because a query downlink 100 has a higher priority for the platform processor 18 than state C. Based on the received query downlink, the platform processor 18 prepares an appropriate response Uplink and sends it back to the network server 14 in box 104 of FIG. 4D and resumes state C in FIG. 4B.

Figure 5:
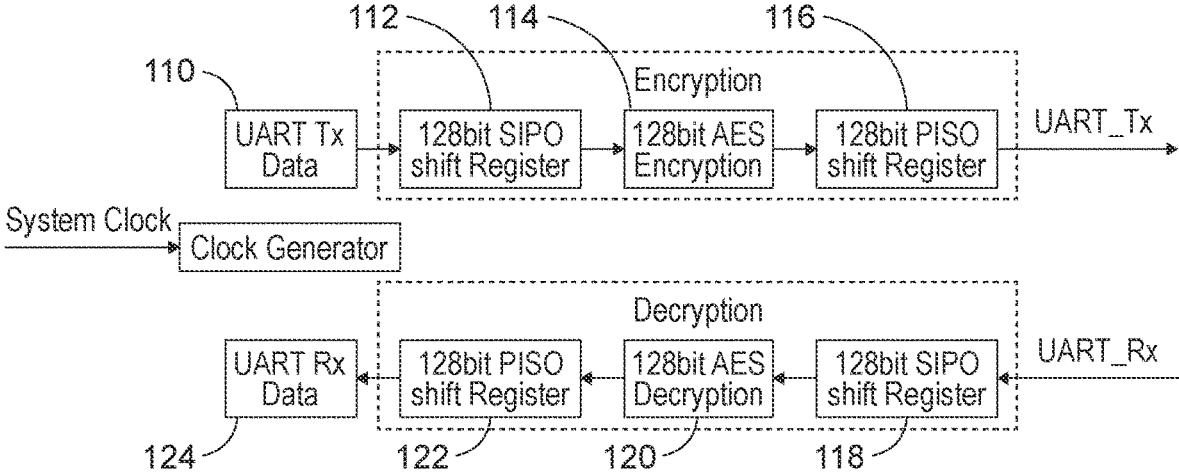
FIG. 5 is a block diagram which depicts in detail a method performed by the modular hardware platform for securely encrypting NIE peripheral device data according to an exemplary embodiment of the present invention.

FIG. 5 is a block diagram which depicts in detail an exemplary embodiment of a method performed by the platform processor 18 of the modular platform 10, for securely encrypting NIE data and decrypting commands using the AES algorithm 18a built into its program memory 18p. The processor 20p of the LoRa module 20 and/or any other processor of any other type of communication module provided in the modular platform 10, can be configured to encrypt NIE data and decrypt commands using the same methods described below. As illustrated in FIG. 5, in addition to the AES algorithm 18a, the program memory 18m of the processor module 18 further includes Serial In Parallel Out shift registers (SIPO) 112 and 118 and Parallel In Serial Out (PISO) shift registers 116 and 122. For ease of illustration only, the NIE data 110 and 110e, the command 124e and 124, the SIPO shift registers 112 and 118, the PISO shift registers 116 and 122, and the AES algorithms 114 and 120 shown in FIG. 5 and described below comprise serial UART temperature data, a UART sense temperature command, 128 bit SIPO shift registers, 128 bit PISO shift registers, and 128 bit AES algorithms, respectively. The encryption method commences with the platform processor 18 inputting serial UART temperature data 110 into the 128 bit SIPO shift register 112, which converts the serial UART temperature data 110 into a 128 bit parallel format. The platform processor 18 then applies a first level of 128 bit AES encryption 114 onto the UART data 110 outputted from the 128 bit SIPO shift register 112 in the parallel 128 bit format. The platform processor 18 then inputs the first level 128 bit AES encrypted data in the parallel 128 bit format into the PISO shift register 116, which outputs a serial first level 128 bit AES encrypted UART temperature data 117, which can be transmitted in a secure way.

The decryption method commences with the platform processor 18 inputting an AES encrypted (e.g., 128 bit AES encrypted) sense temperature command 124e into the 128 bit SIPO shift register 118 which converts the sense temperature command 124e into a 128 bit parallel format. The platform processor 18 then applies a first level of 128 bit AES decryption 120 onto the sense temperature command 124e outputted from the 128 bit SIPO shift register 118 in the parallel 128 bit format. The platform processor 18 then inputs the first level 128 bit AES decrypted sense temperature command in the parallel 128 bit format into the PISO shift register 122, which outputs the sense temperature command 124 in a serial decrypted format which can be read by the platform processor 18.

In some embodiments, the modular platform includes a fallback mechanism for wireless communication. If the primary communication module (e.g., the LoRa module) fails due to some reason, the secondary communication module (e.g., the BLE module) will take over as a fail-safe mechanism and provide an alert to the user about the failure. It will also be possible for the user to configure the primary and secondary wireless communication protocol between Wifi/4G/BLE/LoRaWAN/NBIoT etc.

It should be understood that the invention is not limited to the embodiments illustrated and described herein. Rather, the appended claims should be construed broadly to include other variants and embodiments of the invention, which may be made by those skilled in the art without departing from the scope and range of equivalents of the invention. It is indeed intended that the scope of the invention should be determined by proper interpretation and construction of the appended claims and their legal equivalents, as understood by those of skill in the art relying upon the disclosure in this specification and the attached drawings.

What is claimed is:

1. A modular hardware platform for remote control and monitoring of one or more peripheral devices from a server in a first wireless data communication network, each of the one or more peripheral devices communicating in one of a plurality of different wired communication protocols, the modular hardware platform comprising:

a processor; and a first communication module configured to data communicate in a first wireless communication protocol with the server;

wherein the processor is configured to detect the peripheral device type of each of the one or more peripheral devices, obtain peripheral device data from the one or more peripheral devices, interpret the peripheral device data obtained from each of the one or more of the peripheral devices in any one of the different wired data communication protocols, and translate the peripheral device data in the wired communication protocol of each of the one or more of the peripheral devices, to the first wireless data communication protocol of the first communication module;

wherein the processor is configured with an encryption algorithm for encrypting the translated peripheral device data before transmitting it to the first communication module; and wherein the first communication module includes a processor configured with the encryption algorithm for:

decrypting the encrypted translated peripheral device data; and encrypting the decrypted translated peripheral device data before wirelessly transmitting it in the first wireless communication protocol to the server.

2. The modular hardware platform of claim 1, wherein the first communication module comprises a LoRaWAN (Low Power Wide Area network) communication module which data communicates in a LoRaWan protocol.

3. The modular hardware platform of claim 1, further comprising a second communication module configured to data communicate in a second wireless communication protocol with a wireless device in a second wireless data communication network.

4. The modular hardware platform of claim 3, wherein the second communication module is integrated with the processor.

5. The modular hardware platform of claim 3, wherein the second wireless communication protocol of the second communication module comprises LoRaWAN, BLE, NBIOT, WiFi, GSM, 2G, 3G, 4G, 5G, or any combination thereof.

6. The modular hardware platform of claim 3, wherein the processor is further configured to translate the peripheral device data in the wired communication protocol to the second wireless data communication protocol of the second communication module.

7. The modular hardware platform of claim 1, further comprising a UART interface, a RS485 interface, a SPI interface, a I2C interface, or any combination thereof, in data communication with the processor for obtaining the peripheral device data from each of the one or more of the peripheral devices in the any one of the different wired data communication protocols.

8. The modular hardware platform of claim 7, further comprising a connector for wire connecting each of the one or more peripheral devices to the modular platform.

9. The modular platform of claim 8, wherein the connector is configured to connect a RS485 peripheral device, a I2C peripheral device or a UART peripheral device, or a SPI peripheral device.

10. The modular hardware platform of claim 4, wherein the processor is configured with an encryption algorithm for encrypting the translated peripheral device data before the second communication module transmits it in the second wireless communication protocol to the wireless device.

11. The modular hardware platform of claim 3, wherein the processor is configured with an encryption algorithm for encrypting the translated peripheral device data before transmitting it to the second communication module.

12. The modular hardware platform of claim 1, wherein the one or more peripheral devices comprise sensor and/meters.

13. The modular platform of claim 1, further comprising a second communication module configured to data communicate in a second wireless communication protocol with a wireless device in a second wireless data communication network, wherein the first wireless communication protocol of the first communication module comprises one of LoRaWAN, BLE, NBIOT, WiFi, GSM, 2G, 3G, 4G, 5G and wherein the second communication protocol of the second communication module comprises one of LoRaWAN, BLE, NBIOT, WiFi, GSM, 2G, 3G, 4G, 5G, which is different from the communication protocol of the first communication module.

14. A modular hardware platform for remote control and monitoring of one or more peripheral devices from a server in a first wireless data communication network, each of the one or more peripheral devices communicating in one of a plurality of different wired communication protocols, the modular hardware platform comprising:
  a processor;
  a first communication module configured to data communicate in a first wireless communication protocol with the server; and
  a second communication module configured to data communicate in a second wireless communication protocol with a wireless device in a second wireless data communication network;
  wherein the processor is configured to detect the peripheral device type of each of the one or more peripheral devices, obtain peripheral device data from the one or more peripheral devices, interpret the peripheral device data obtained from each of the one or more of the peripheral devices in any one of the different wired data communication protocols, and translate the peripheral device data in the wired communication protocol of each of the one or more of the peripheral devices, to the first wireless data communication protocol of the first communication module;
  wherein the processor is configured with an encryption algorithm for encrypting the translated peripheral device data before transmitting it to the second communication module; and
  wherein the second communication module includes a processor configured with the encryption algorithm for:
  decrypting the encrypted translated peripheral device data; and
  encrypting the decrypted translated peripheral device data before wirelessly transmitting it in the second wireless communication protocol to the wireless device in the wireless data communication network.

15. The modular hardware platform of claim 14, wherein the processor is configured with an encryption algorithm for encrypting the translated peripheral device data before transmitting it to the first communication module.

16. A method for remote control and monitoring of one or more peripheral devices from a server in a first wireless data communication network, each of the one or more peripheral devices communicating in one of a plurality of different wired communication protocols, the method comprising:
  detecting, with a processor, the peripheral device type of one of the one or more peripheral devices;
  obtaining, with the processor, peripheral device data from the one of the one or more peripheral devices;
  interpreting, with the processor, the peripheral device data obtained from the one of the one or more of the peripheral devices in the one of the plurality of different wired data communication protocols;
  translating, with the processor, the peripheral device data in the one of the plurality of different wired data communication protocols, to a first wireless data communication protocol of a first communication module;
  encrypting, with the processor, the peripheral device data;
  transmitting, with the processor, the encrypted translated peripheral device data in the first wireless communication protocol to the first communication module;
  decrypting, with the first communication module the encrypted translated peripheral device data received from the processor;
  encrypting, with the first communication module the decrypted translated peripheral device data; and
  transmitting, with the first communication module, the encrypted peripheral device data in the first wireless communication protocol to the server.

17. The method of claim 16, wherein the detecting step is further performed with a peripheral interface in data communication with the processor.

18. The method of claim 17, wherein the peripheral interface comprises one of a UART interface, a RS485 interface, a SPI interface, and a I2C interface.

19. The method of claim 16, further comprising encrypting, with the first communication module, the peripheral device data in the first wireless communication protocol before transmitting it to the server.

20. The method of claim 19, wherein the first communication module comprises a processor which is configured with an encryption algorithm for encrypting the translated peripheral device data.

21. The method of claim 16, wherein the one or more peripheral devices comprise sensor and/meters.

22. The method of claim 16, further comprising:

detecting, with the processor, the peripheral device type of one or a second one of the one or more peripheral devices;

obtaining, with the processor, peripheral device data from the one or the second one of the one or more peripheral devices;

interpreting, with the processor, the peripheral device data obtained from the one or the second one of the one or more of the peripheral devices in the one of the plurality of different wired data communication protocols;

translating, with the processor, the peripheral device data in the one of the plurality of different wired data communication protocols, to a second wireless data communication protocol of a second communication module;

transmitting, with the processor, the peripheral device data in the second wireless communication protocol to the second communication module; and transmitting, with the second communication module, the peripheral device data in the second wireless communication protocol to a mobile device.

23. A method for remote control and monitoring of one or more peripheral devices from a server in a first wireless data communication network, each of the one or more peripheral devices communicating in one of a plurality of different wired communication protocols, the method comprising:

detecting, with a processor, the peripheral device type of one of the one or more peripheral devices;

obtaining, with the processor, peripheral device data from the one of the one or more peripheral devices;

interpreting, with the processor, the peripheral device data obtained from the one of the one or more of the peripheral devices in the one of the plurality of different wired data communication protocols;

translating, with the processor, the peripheral device data in the one of the plurality of different wired data communication protocols, to a first wireless data communication protocol of a first communication module;

transmitting, with the processor, the peripheral device data in the first wireless communication protocol to the first communication module;

transmitting, with the first communication module, the peripheral device data in the first wireless communication protocol to the server;

wherein if the first communication module fails further comprising:

translating, with the processor, the peripheral device data in the one of the plurality of different wired data communication protocols, to a second wireless data communication protocol of a second communication module which is operative as a fail-safe communication module;

transmitting, with the processor, the peripheral device data in the second wireless communication protocol to the second communication module;

transmitting, with the second communication module, the peripheral device data in the second wireless communication protocol to the server; and alerting a user of the modular platform of the failure of the first communication module.

24. The method of claim 23, wherein the second wireless communication protocol of the second communication module comprises LoRaWAN, BLE, NBIOT, WiFi, GSM, 2G, 3G, 4G, 5G, or any combination thereof.

25. The method of claim 23, further comprising encrypting, with the processor, the translated peripheral device data before transmitting it to the first communication module.

26. The method of claim 25, wherein the processor is configured with an encryption algorithm for encrypting the translated peripheral device data.

* * * * *